United States Patent
Osswald

(10) Patent No.: US 9,224,997 B2
(45) Date of Patent: Dec. 29, 2015

(54) BATTERY PACK AND HANDHELD POWER TOOL HAVING A BATTERY PACK

(75) Inventor: Alexander Osswald, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1104 days.

(21) Appl. No.: 13/000,680

(22) PCT Filed: May 8, 2009

(86) PCT No.: PCT/EP2009/055600
§ 371 (c)(1),
(2), (4) Date: Dec. 22, 2010

(87) PCT Pub. No.: WO2009/156223
PCT Pub. Date: Dec. 30, 2009

(65) Prior Publication Data
US 2011/0111270 A1    May 12, 2011

(30) Foreign Application Priority Data
Jun. 26, 2008   (DE) .......................... 10 2008 002 665

(51) Int. Cl.
*H01M 2/12* (2006.01)
*H01M 2/10* (2006.01)
H01M 10/0525 (2010.01)

(52) U.S. Cl.
CPC .......... *H01M 2/1094* (2013.01); *H01M 2/1022* (2013.01); *H01M 2/105* (2013.01); *H01M 2/12* (2013.01); *H01M 10/0525* (2013.01)

(58) Field of Classification Search
CPC . H01M 2/1022; H01M 2/1094; H01M 2/105; H01M 2/12; H01M 10/0525; Y02E 60/12
USPC .................................................... 429/53, 163
See application file for complete search history.

(56) References Cited

U.S. PATENT DOCUMENTS

| | | | | |
|---|---|---|---|---|
| 5,322,745 A | * | 6/1994 | Yanagihara et al. | ............. 429/59 |
| 5,633,095 A | * | 5/1997 | Ishikawa et al. | ................... 429/1 |
| 5,895,728 A | * | 4/1999 | Walker et al. | .................... 429/53 |
| 2002/0086201 A1 | | 7/2002 | Payen et al. | |
| 2003/0082439 A1 | | 5/2003 | Sakakibara | |
| 2003/0096160 A1 | * | 5/2003 | Sugiura et al. | ................ 429/120 |
| 2005/0181272 A1 | | 8/2005 | Kim | |
| 2010/0055556 A1 | * | 3/2010 | Meschter | ....................... 429/159 |

FOREIGN PATENT DOCUMENTS

| | | |
|---|---|---|
| DE | 38 43 907 A1 | 7/1990 |
| DE | 20318982 U1 | 5/2004 |
| JP | 59078446 A | 5/1984 |
| JP | 2000-188091 A | 7/2000 |
| JP | 2001-110376 A | 4/2001 |
| JP | 2003282135 A | 10/2003 |
| JP | 2006-164655 A | 6/2006 |
| JP | 2007-157358 A | 6/2007 |
| JP | 2007-273180 A | 10/2007 |
| JP | 2007-317578 A | 12/2007 |
| WO | 2008/145455 A1 | 12/2008 |

* cited by examiner

*Primary Examiner* — Gary Harris
(74) *Attorney, Agent, or Firm* — Maginot, Moore & Beck LLP

(57) ABSTRACT

The invention relates to a battery pack comprising at least one battery cell and a housing for accommodating the at least one battery cell. It is proposed that the housing is designed as at least double-walled having at least one inner sheath and one outer sheath. According to the invention, an intermediate volume is enclosed between the at least one inner sheath and the outer sheath. The intermediate volume is able to absorb a pressure wave from an internal volume containing the battery cells.

18 Claims, 1 Drawing Sheet

BATTERY PACK AND HANDHELD POWER TOOL HAVING A BATTERY PACK

CROSS-REFERENCE TO RELATED APPLICATION

This application is a 35 USC 371 application of PCT/EP 2009/055600 filed on May 8, 2009.

BACKGROUND OF THE INVENTION

1. Field of the Invention

The invention is based on a battery pack with a battery pack and is based on a handheld power tool with a battery pack.

2. Description of the Prior Art

It is known to combine a plurality of battery cells to form a so-called battery pack; in this context, the term "battery" is understood to refer to both a non-rechargeable and a rechargeable storage unit. Usually, the battery packs have a housing made of plastic, with recesses into which usually cylindrical battery cells are inserted.

Frequently, such battery packs are used to supply power to a consumer such as an electric vehicle or electrical appliance, in particular a power tool. This battery pack can be disconnected from the appliance by means of a mechanical interface and an electrical plug connector and is therefore referred to as a replaceable pack. During operation, the battery packs heat up due to powerful active currents, with waste heat being generated due to the power transformation occurring in the battery cells.

It is known to provide the battery cells in a battery pack with an integrated protective mechanism.

ADVANTAGES AND SUMMARY OF THE INVENTION

The invention is based on a battery pack with at least one battery cell and with a housing for accommodating the at least one battery cell.

According to one proposal, the housing is embodied as at least double-walled, with at least one inner casing and one outer casing; between the at least one inner casing and the outer casing, an intermediate volume is enclosed, which can absorb a pressure wave from an internal volume.

The housing can be embodied as double-walled or as more than double-walled. The intermediate volume is advantageously of sufficient volume to absorb an overpressure to be expected in the event of a malfunction, permitting the outer casing to remain intact. Advantageously, battery cells in the battery pack do not require any specially integrated protective mechanisms or protective electronics. In the event of a malfunction, the outer casing can protect an appliance or power tool into which the battery pack is inserted as well as its user. The wiring expense usually required for an electronic cell monitoring can be eliminated. It is possible to use inexpensive battery cells without integrated protective mechanisms, which are significantly more reasonably priced than battery cells with the protective mechanisms.

Preferably, the at least one inner casing can have an overpressure outlet. In the simplest case, the overpressure outlet can be a simple opening in the inner casing. Alternatively, the overpressure outlet can be a pressure relief valve that can open toward the intermediate volume when an excessively high overpressure occurs in the internal volume.

Preferably, the inner casing can be composed of a noncombustible material. The inner casing can be composed of a flexible material in at least some regions. For example, the inner casing can be advantageously composed of a woven material, e.g. a carbon fiber weave. The inner casing can also be composed of a rigid material in at least some regions. For example, the inner casing can be advantageously composed of a plastic. It is also conceivable for an inner casing to have both flexible and rigid regions. The person of ordinary skill in the art can make the suitable material selection depending on the battery pack size and the conditions in which it will be used.

Like the inner casing, the outer casing can be composed of a flexible material in at least some regions or can be composed of a rigid material in at least some regions. It is also conceivable for an outer casing to have flexible and rigid regions. The person of ordinary skill in the art can make the suitable material selection depending on the battery pack size and the conditions in which it will be used.

The intermediate volume can be advantageously filled with a stabilizing material, which, when an overpressure occurs, conveys it to the outer casing in a delayed fashion. For example, the stabilizing material can be honeycomb-shaped so that when a pressure wave is released, deformation work must be expended, thus permitting the strain on the outer casing to be reduced.

The intermediate volume can be advantageously filled with an absorber material that can at least partially absorb material emerging from the internal volume. It is thus possible for the absorber material to absorb and optionally also chemically neutralize electrolyte escaping from the battery cells. Preferably, the absorber material is air-permeable.

Another preferred embodiment is a hand-held power tool with a battery pack, whose housing is embodied as at least double-walled, with at least one inner casing and an outer casing; between the at least one inner casing and the outer casing, an intermediate volume is enclosed, which can absorb a pressure wave from an internal volume.

Basically, however, the proposed battery pack can also be used in other machines and in vehicles.

BRIEF DESCRIPTION OF THE DRAWINGS

The invention will be described below in conjunction with the accompanying drawings, in which.

DESCRIPTION OF THE PREFERRED EMBODIMENTS

Figure 1:
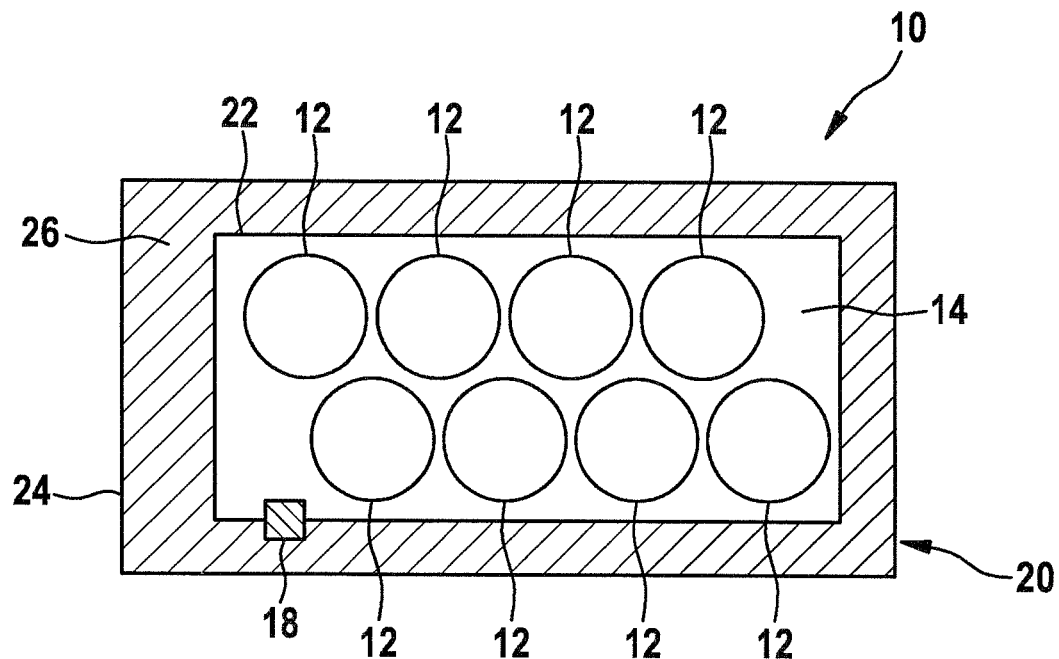
FIG. 1 shows a cross-section through a first embodiment of a preferred battery pack according to the invention.

In the drawings, parts that are the same or similar have been provided with the same reference numerals.

FIG. 1 shows a cross-section through a preferred battery pack 10 with a plurality of battery cells 12 that are situated in a housing 20. For example, the housing 20 is embodied as double-walled and has an inner casing 22 and an outer casing 24.

The battery cells are situated in an internal volume 14 inside the inner casing 22. For example, the battery cells can be lithium ion cells. Between the inner casing 22 and the outer casing 24, there is an intermediate volume 26 that is embodied to absorb an overpressure from the internal volume 14. For example, the intermediate volume 26 is large enough and/or the outer casing 24 is stable enough that the outer casing 24 is able to withstand a suddenly occurring overpressure.

The inner casing 22 is composed of a flexible or rigid material and for example has an overpressure outlet 18 embodied in the form of a pressure relief valve.

The intermediate volume 26 is embodied as large enough that in the event of a malfunction in which an excessively high overpressure occurs in the internal volume 14, the intermediate volume 26 can absorb the overpressure to an extent that permits the outer casing 24 to remain intact.

Figure 2:
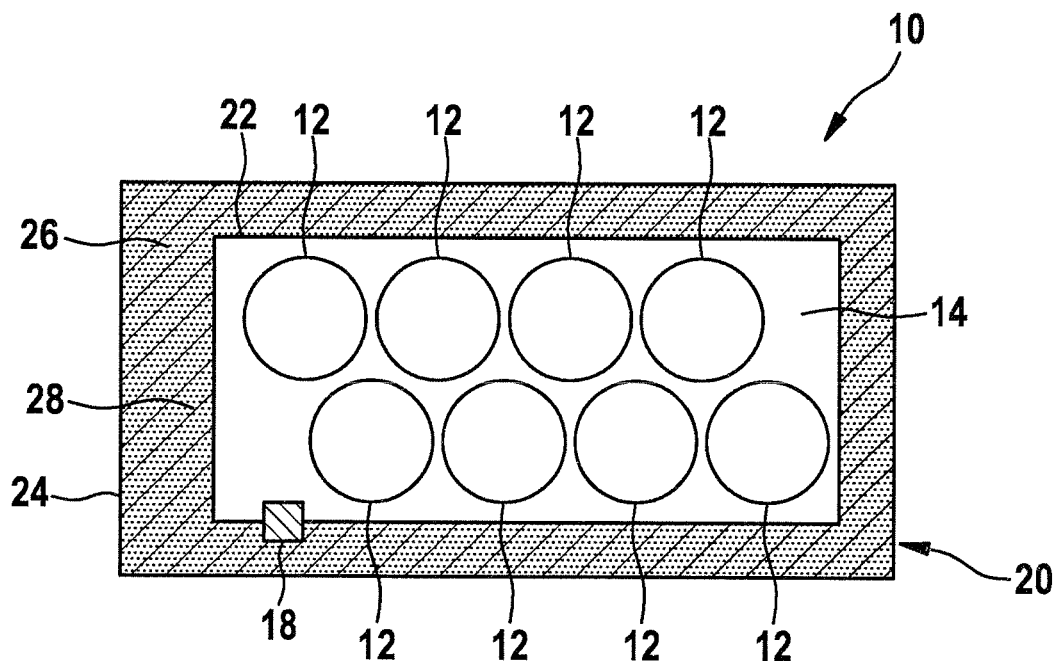
FIG. 2 shows a cross-section through another embodiment of a preferred battery pack, with an absorber in an intermediate volume according to the invention.

FIG. 2 shows a cross-section through another embodiment of a preferred battery pack 10. The design largely corresponds to the one shown in FIG. 1; the reader is therefore referred to this prior figure description in order to avoid unnecessary repetition. By contrast with the exemplary embodiment in FIG. 1, the intermediate volume 26 is filled with an absorber material 28 that is able to at least partially absorb material escaping from the internal volume 14, e.g. electrolyte form the battery cells 12. This makes it possible to further increase the safety of the battery pack 10.

A battery pack of this kind can be advantageously used in a hand-held power tool that is to be operated cordlessly.

The foregoing relates to the preferred exemplary embodiments of the invention, it being understood that other variants and embodiments thereof are possible within the spirit and scope of the invention, the latter being defined by the appended claims.

The invention claimed is:

1. A battery pack, comprising:
at least one battery cell; and
a double-walled housing including at least one inner casing and at least one outer casing that define the walls of the housing,
wherein the inner casing defines an internal volume configured to accommodate the at least one battery cell,
wherein the inner casing and the outer casing define an intermediate volume continuously and entirely surrounding the inner casing, the intermediate volume enclosed entirely between the inner casing and the outer casing and configured to receive a pressure wave from the internal volume,
wherein the outer casing is a continuous outer casing configured to separate the intermediate volume from the atmosphere, and
wherein the inner casing includes a pressure relief valve configured to open in the direction of the intermediate volume when an overpressure occurs in the internal volume, the continuous outer casing configured to remain intact when the intermediate volume receives the pressure wave during the overpressure and to contain the pressure wave entirely within the intermediate volume.

2. The battery pack as recited in claim 1, wherein the inner casing is composed of a flexible material in at least some regions thereof, the flexible material being relatively more flexible than regions of the inner casing composed of material different than the flexible material.

3. The battery pack as recited in claim 1, wherein the inner casing is composed of a rigid material in at least some regions thereof, the rigid material being relatively more rigid than regions of the inner casing composed of material different than the rigid material.

4. The battery pack as recited in claim 2, wherein the inner casing is composed of a rigid material in at least some regions thereof, the rigid material being relatively more rigid than regions of the inner casing composed of material different than the rigid material.

5. The battery pack as recited in claim 1, wherein the outer casing is composed of a flexible material in at least some regions thereof, the flexible material being relatively more flexible than regions of the outer casing composed of material different than the flexible material.

6. The battery pack as recited in claim 1, wherein the outer casing is composed of a rigid material in at least some regions thereof, the rigid material being relatively more rigid than regions of the outer casing composed of material different than the rigid material.

7. The battery pack as recited in claim 1, wherein the inner casing is composed of a noncombustible material.

8. The battery pack as recited in claim 1, wherein the intermediate volume is filled with a honeycomb-shaped stabilizing material, which, when an overpressure occurs in the internal volume, is configured to convey pressure to the outer casing in a manner slower than the conveyance of the pressure in the absence of the stabilizing material.

9. The battery pack as recited in claim 1, wherein the intermediate volume is filled with an absorber material configured to at least partially absorb material escaping from the internal volume.

10. A hand-held power tool, comprising:
a battery pack including:
at least one battery cell; and
a double-walled housing including at least one inner casing and at least one outer casing that define the walls of the housing,
wherein the inner casing defines an internal volume configured to accommodate the at least one battery cell,
wherein the inner casing and the outer casing define an intermediate volume continuously and entirely surrounding the inner casing, the intermediate volume enclosed entirely between the inner casing and the outer casing and configured to receive a pressure wave from the internal volume,
wherein the outer casing is a continuous outer casing configured to separate the intermediate volume from the atmosphere, and
wherein the inner casing includes a pressure relief valve configured to open in the direction of the intermediate volume when an overpressure occurs in the internal volume, the continuous outer casing configured to remain intact when the intermediate volume receives the pressure wave during the overpressure and to contain the pressure wave entirely within the intermediate volume.

11. The battery pack as recited in claim 2, wherein the flexible material of the inner casing is configured to flex in response to exposure to the pressure wave.

12. The battery pack as recited in claim 3, wherein the rigid material of the inner casing is configured to remain rigid in response to exposure to the pressure wave.

13. The battery pack as recited in claim 4, wherein the rigid material of the inner casing is configured to remain rigid in response to exposure to the pressure wave.

14. The battery pack as recited in claim 5, wherein the flexible material of the outer casing is configured to flex in response to exposure to the pressure wave.

15. The battery pack as recited in claim 6, wherein the rigid material of the outer casing is configured to remain rigid in response to exposure to the pressure wave.

16. The battery pack as recited in claim 1, wherein the outer casing encloses the intermediate volume such that the overpressure from the internal volume is retained within the intermediate volume.

17. The battery pack as recited in claim 1, wherein the inner casing is composed of a woven material in at least some regions thereof.

18. The battery pack as recited in claim 17, wherein the woven material is configured as a carbon fiber weave.

* * * * *